US010091236B2

(12) United States Patent
Liu et al.

(10) Patent No.: US 10,091,236 B2
(45) Date of Patent: Oct. 2, 2018

(54) METHODS APPARATUSES, AND STORAGE MEDIUMS FOR ACQUIRING LEGITIMATE INSTALLATION PACKAGES

(71) Applicant: Beijing Xiaomi Mobile Software Co., Ltd., Haidian District, Beijing (CN)

(72) Inventors: Shuo Liu, Beijing (CN); Xuhua Zhang, Beijing (CN); Dalong Shi, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/495,473

(22) Filed: Apr. 24, 2017

(65) Prior Publication Data

US 2017/0318030 A1    Nov. 2, 2017

(30) Foreign Application Priority Data

Apr. 28, 2016  (CN) .......................... 2016 1 0281325

(51) Int. Cl.
*H04L 29/06* (2006.01)
*G06F 21/50* (2013.01)

(52) U.S. Cl.
CPC .......... *H04L 63/145* (2013.01); *H04L 63/123* (2013.01); *H04L 63/126* (2013.01); *G06F 21/50* (2013.01)

(58) Field of Classification Search
CPC ....... H04L 63/23; H04L 63/126; G06F 21/08; G06F 21/0128; G06F 21/50; G06F 21/57
See application file for complete search history.

(56) References Cited

U.S. PATENT DOCUMENTS 9,043,922 B1 *  5/2015  Dumitras .............. G06F 21/577
                                                    726/25
9,589,129 B2 *  3/2017  Richardson ............. G06F 21/50
(Continued)

FOREIGN PATENT DOCUMENTS

CN        102799445 A    11/2012
CN        102831338 A    12/2012
(Continued)

OTHER PUBLICATIONS

Extended European Search Report issued in connection with EP Application No. 17168229.7, dated Jul. 12, 2017, 8 pages.
(Continued)

*Primary Examiner* — Hadi S Armouche
*Assistant Examiner* — Shaqueal D Wade
(74) *Attorney, Agent, or Firm* — Arch & Lake LLP

(57) ABSTRACT

Methods, apparatuses, and storage mediums are provided for acquiring a legitimate installation package the field of computer technology. The method includes: acquiring characteristic information of a first installation package; sending the characteristic information to an authentication server; receiving a differential package fed back by the authentication server; and combining the differential package with the first installation package to obtain a legitimate installation package. The present disclosure solves the problem in the prior art that a user can only download a legitimate installation package of an application again to re-install the application when the user finds that malicious codes are implanted in an installed installation package of the application.

6 Claims, 12 Drawing Sheets

(56) References Cited

U.S. PATENT DOCUMENTS

| | | | | |
|---|---|---|---|---|
| 2002/0002703 A1* | 1/2002 | Baentsch | ................. | G06F 8/68 |
| | | | | 717/170 |
| 2010/0218243 A1 | 8/2010 | Dehaan | | |
| 2014/0245438 A1* | 8/2014 | Chen | ....................... | H04L 67/06 |
| | | | | 726/22 |
| 2016/0092190 A1* | 3/2016 | Chen | ........................ | G06F 8/61 |
| | | | | 717/177 |
| 2017/0272420 A1* | 9/2017 | Yang | ...................... | H04L 63/08 |

FOREIGN PATENT DOCUMENTS

| | | |
|---|---|---|
| CN | 103368987 A | 10/2013 |
| CN | 103632089 A | 3/2014 |
| CN | 104123491 A | 10/2014 |
| CN | 104216736 A | 12/2014 |
| EP | 1168165 | 1/2002 |

OTHER PUBLICATIONS

International Search Report and Written Opinion issued in corresponding International Application No. PCT/CN2016/097011, dated Jan. 24, 2017, 11 pages.
First Office Action issued in corresponding Chinese Application No. 201610281325.0 dated Apr. 24, 2018, 7 pages.

* cited by examiner

METHODS APPARATUSES, AND STORAGE MEDIUMS FOR ACQUIRING LEGITIMATE INSTALLATION PACKAGES

CROSS-REFERENCE TO RELATED APPLICATION

This application is based on and claims the priority of the Chinese patent application No. 201610281325.0, filed on Apr. 28, 2016, which is incorporated herein by reference in its entirety.

TECHNICAL FIELD

The present disclosure is related to the field of computer technology, and more particularly to methods, apparatuses, and a storage mediums for acquiring a legitimate installation package.

BACKGROUND

Currently, many websites providing application downloading services allow users to post information such as installation packages of applications, so as to save the staff of the websites from collecting installation packages. However, quite a few malicious hackers take advantage of this and post installation packages having malicious codes implanted therein to the websites. Once an installation package having malicious codes implanted therein is downloaded and installed by a terminal, the privacy of the terminal's owner is exposed to security risks.

When finding that malicious codes are implanted in an installed installation package of an application, a user can only download a legitimate installation package of the application again to re-install the application.

SUMMARY

The present disclosure provides methods, apparatus, and a storage medium for acquiring legitimate installation package.

According to a first aspect of embodiments of the present disclosure, there is provided a method implemented in a terminal. The method includes: acquiring characteristic information of a first installation package, the characteristic information uniquely identifying codes of the first installation package; sending the characteristic information to an authentication server, the characteristic information triggering the authentication server to feed back to the terminal a differential package corresponding to the characteristic information when the authentication server determines that the first installation package is an illegitimate installation package based on the characteristic information; receiving the differential package fed back by the authentication server, the differential package including a difference between the illegitimate installation package and a legitimate installation package corresponding to the illegitimate installation package; and combining the differential package with the first installation package to obtain the legitimate installation package.

According to a second aspect of the embodiments of the present disclosure, there is provided a method implemented in an authentication server. The method includes: receiving characteristic information sent by a terminal, the characteristic information being generated by the terminal based on an acquired first installation package and uniquely identifying codes of the first installation package; determining whether the characteristic information is characteristic information of an illegitimate installation package; acquiring a differential package based on a difference between the illegitimate installation package corresponding to the characteristic information and a legitimate installation package corresponding to the illegitimate installation package, when determining that the characteristic information is the characteristic information of the illegitimate installation package; and feeding the differential package back to the terminal, the differential package triggering the terminal to combine the differential package with the first installation package to obtain a combined installation package.

According to a third aspect of the embodiments of the present disclosure, there is provided a legitimate installation package acquiring apparatus implemented in a terminal. The apparatus includes: a first acquiring module configured to acquire characteristic information of a first installation package, the characteristic information uniquely identifying codes of the first installation package; a first sending module configured to send the characteristic information acquired by the first acquiring module to an authentication server, the characteristic information triggering the authentication server to feed back to the terminal a differential package corresponding to the characteristic information when the authentication server determines that the first installation package is an illegitimate installation package based on the characteristic information; a receiving module configured to receive the differential package fed back by the authentication server, the differential package including a difference between the illegitimate installation package and a legitimate installation package corresponding to the illegitimate installation package; and a combining module configured to combine the differential package received by the receiving module with the first installation package to obtain the legitimate installation package.

According to a fourth aspect of the embodiments of the present disclosure, there is provided a legitimate installation package acquiring apparatus implemented in an authentication server. The apparatus includes: a first receiving module configured to receive characteristic information sent by a terminal, the characteristic information being generated by the terminal based on an acquired first installation package and uniquely identifying codes of the first installation package; a determining module configured to determine whether the characteristic information received by the first receiving module is characteristic information of an illegitimate installation package; an acquiring module configured to acquire a differential package based on a difference between the illegitimate installation package corresponding to the characteristic information and a legitimate installation package corresponding to the illegitimate installation package when the determining module determines that the characteristic information is the characteristic information of the illegitimate installation package; and a feedback module configured to feed the differential package acquired by the acquiring module back to the terminal, the differential package triggering the terminal to combine the differential package with the first installation package to obtain a combined installation package.

According to a fifth aspect of the embodiments of the present disclosure, there is provided a legitimate installation package acquiring system, including at least one terminal and an authentication server. The terminal includes the legitimate installation package acquiring apparatus according to any of the third aspect and optional implementations based on the third aspect, and the authentication server includes the legitimate installation package acquiring apparatus according to any of the fourth aspect and optional implementations based on the fourth aspect.

According to a sixth aspect of the embodiments of the present disclosure, there is provided a legitimate installation package acquiring apparatus, implemented in a terminal and including: a processor; and a memory configured to store instructions executable by the processor. The processor is configured to: acquire characteristic information of a first installation package, the characteristic information uniquely identifying codes of the first installation package; send the characteristic information to an authentication server, the characteristic information triggering the authentication server to feed back to the terminal a differential package corresponding to the characteristic information when the authentication server determines that the first installation package is an illegitimate installation package based on the characteristic information; receive the differential package fed back by the authentication server, the differential package including a difference between the illegitimate installation package and a legitimate installation package corresponding to the illegitimate installation package; and combine the differential package with the first installation package to obtain the legitimate installation package.

According to a seventh aspect of the embodiments of the present disclosure, there is provided a legitimate installation package acquiring apparatus, implemented in an authentication server and including: a processor; and a memory configured to store instructions executable by the processor, wherein the processor is configured to: receive characteristic information sent by a terminal, the characteristic information being generated by the terminal based on an acquired first installation package and uniquely identifying codes of the first installation package; determine whether the characteristic information is the characteristic information of an illegitimate installation package; acquire a differential package based on a difference between the illegitimate installation package corresponding to the characteristic information and a legitimate installation package corresponding to the illegitimate installation package, when determining that the characteristic information is the characteristic information of the illegitimate installation package; and feed the differential package back to the terminal, the differential package triggering the terminal to combine the differential package with the first installation package to obtain a combined installation package.

According to an eighth aspect of the embodiments of the present disclosure, there is provided a non-transitory computer-readable storage medium having stored therein instructions that, when executed by a processor of a mobile terminal, causes the mobile terminal to perform acts including: acquiring characteristic information of a first installation package, the characteristic information uniquely identifying codes of the first installation package; sending the characteristic information to an authentication server, the characteristic information triggering the authentication server to feed back to the terminal a differential package corresponding to the characteristic information when the authentication server determines that the first installation package is an illegitimate installation package based on the characteristic information; receiving the differential package fed back by the authentication server, the differential package including a difference between the illegitimate installation package and a legitimate installation package corresponding to the illegitimate installation package; and combining the differential package with the first installation package to obtain the legitimate installation package.

It should be understood that both the foregoing general description and the following detailed description are only exemplary and explanatory and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figure 1:
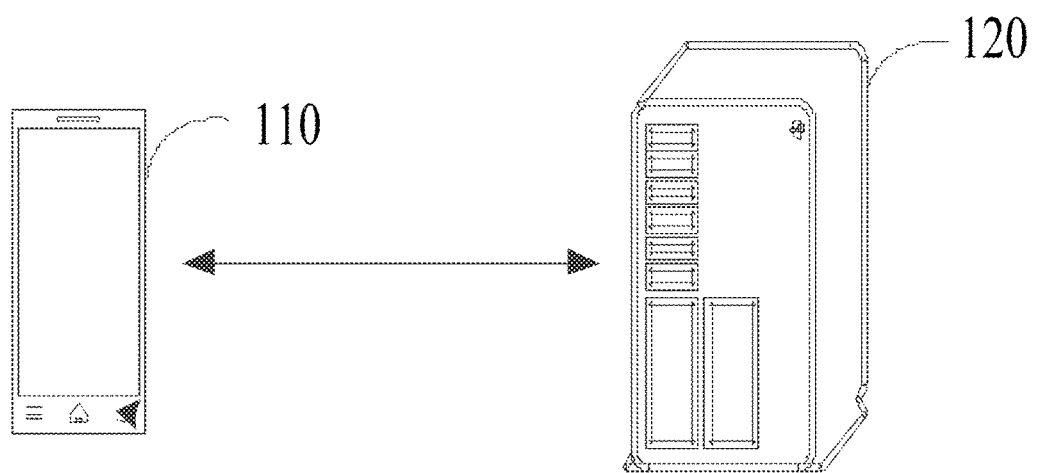
FIG. 1 is a schematic diagram of an implementation environment of an example method according to an exemplary embodiment.

FIG. 1 is a schematic diagram of an implementation environment of a method for acquiring a legitimate installation package according to an exemplary embodiment. As shown in FIG. 1, the implementation environment may include at least one terminal 110 and an authentication server 120.

The terminal 110 and the authentication server 120 may be connected via a wireless network, a wired network, or a combination of wireless network and wired network. The wireless network referred to herein may be a mobile data network, a Wireless-Fidelity (Wi-Fi) network, a Bluetooth network or the like.

The terminal 110 may send information to the authentication server 120, and may also acquire information therefrom.

The authentication server 120 referred to herein may be an authentication server, an authentication server cluster composed of several authentication servers, a server implemented by a cloud computing center, or any other server used for authentication.

Alternatively or additionally, the implementation environment may further include an installation package providing server and a legitimate installation package providing server, from each of which the terminal 110 may download an installation package.

The legitimate installation package providing server may be connected to or be a part of the authentication server 120.

Figure 2:
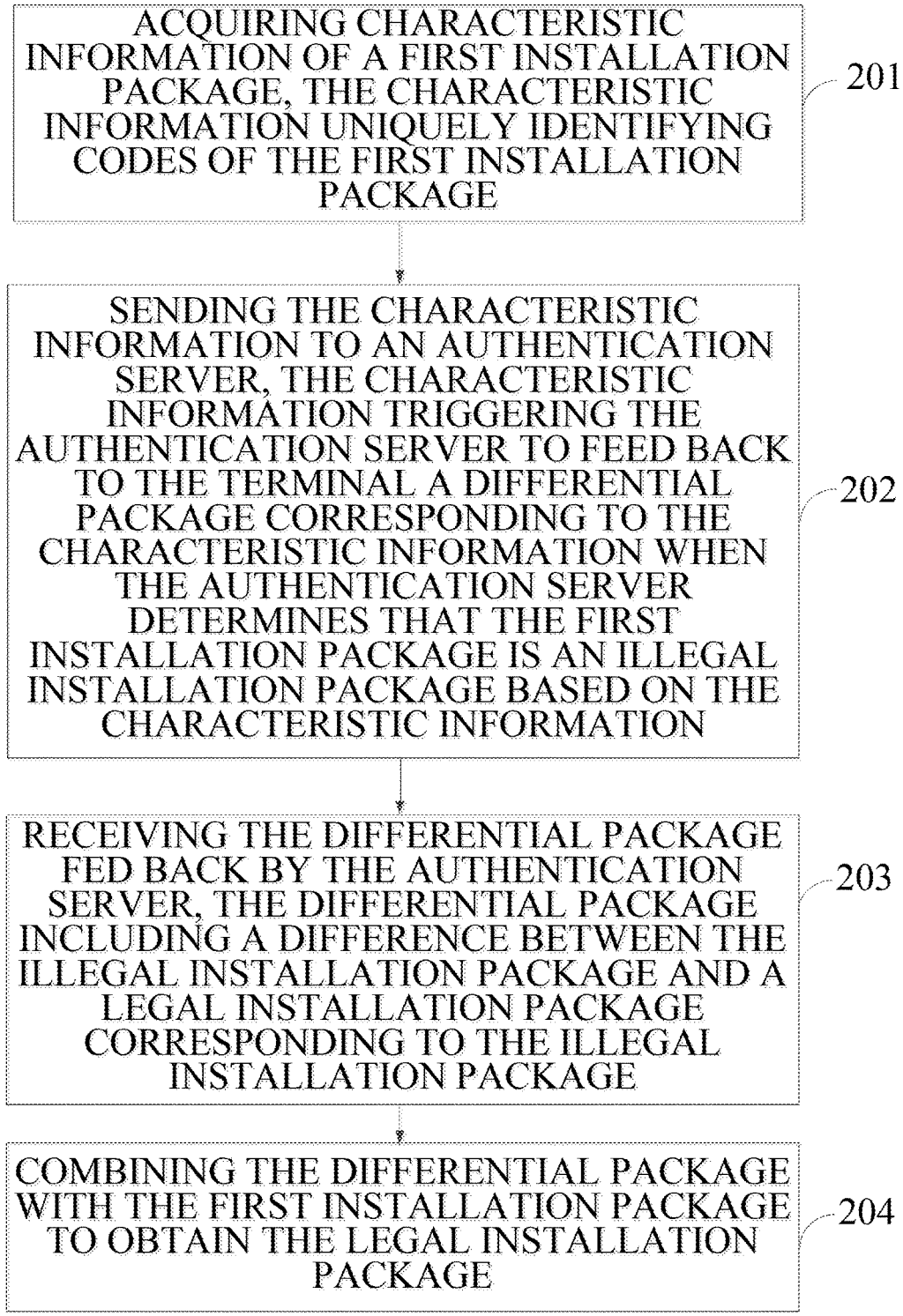
FIG. 2 is a flow chart of a method for acquiring a legitimate installation package according to an exemplary embodiment.

FIG. 2 is a flow chart of a method for acquiring a legitimate installation package according to an exemplary embodiment. As shown in FIG. 2, the method may be implemented in the terminal 110 shown in FIG. 1, and may include the following steps.

In Step 201, characteristic information of a first installation package is acquired, the characteristic information uniquely identifying codes of the first installation package. For example, the characteristic information may include a hash-based verification value, a value calculated based on cryptographic hash functions, or a value calculated using a combination of different secure hash algorithms.

In Step 202, the characteristic information is sent to an authentication server, the characteristic information triggering the authentication server to feed back to the terminal a differential package corresponding to the characteristic information when the authentication server determines that the first installation package is an illegitimate installation package based on the characteristic information.

In Step 203, the differential package fed back by the authentication server is received, the differential package including a difference between the illegitimate installation package and a legitimate installation package corresponding to the illegitimate installation package.

In Step 204, the differential package is combined with the first installation package to obtain the legitimate installation package.

In sum, according to the method provided in this disclosure, characteristic information of a first installation package is sent to an authentication server. When a differential installation package fed back by the authentication server based on the characteristic information of the first installation package is received, the differential package may be combined with the first installation package to obtain a legitimate installation package. As such, the terminal can convert the first installation package into the legitimate installation package using the differential package, thereby solving the problem in the prior art that a user can only download a legitimate installation package of an application again to re-install the application when the user finds that malicious codes are implanted in an installed installation package of the application. The disclosed method achieves the following effects: an uninstalled illegitimate installation package is automatically converted into the legitimate installation package using the differential package, so that the user does not need to download the legitimate installation package again. Thus, the user only need to spend limited extra data usage to acquire the legitimate installation package instead of downloading the whole legitimate installation package.

Figure 3:
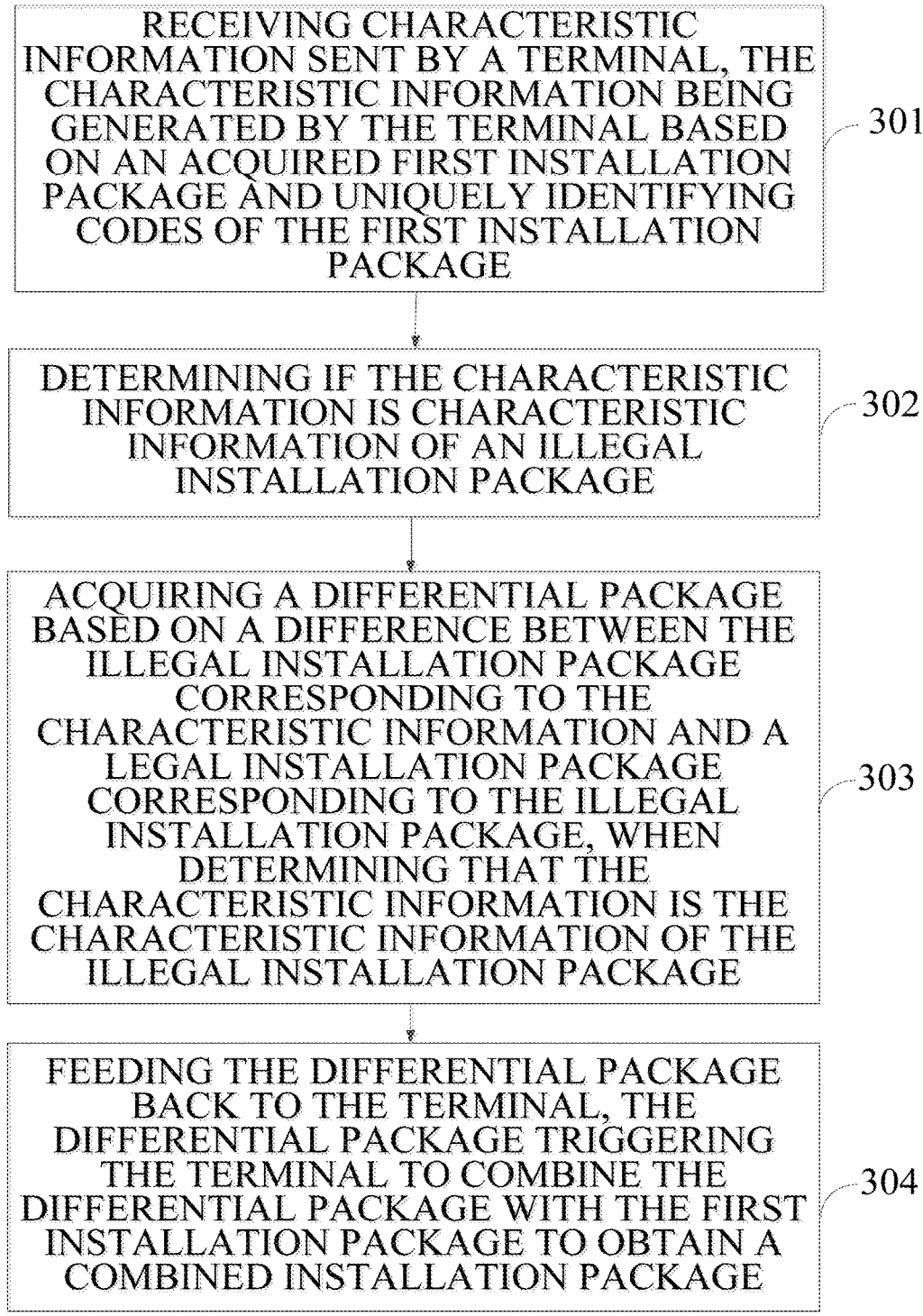
FIG. 3 is a flow chart of a method for acquiring a legitimate installation package according to another exemplary embodiment.

FIG. 3 is a flow chart of a legitimate installation package acquiring method according to another exemplary embodiment. As shown in FIG. 3, the method may be implemented in the authentication server 120 shown in FIG. 1, and includes the following steps.

In Step 301, characteristic information sent by a terminal is received, the characteristic information being generated by the terminal based on an acquired first installation package and uniquely identifying codes of the first installation package. For example, the authentication server may receive the characteristic information sent by a terminal when the terminal is ready to install the first installation package.

In Step 302, it is determined whether the characteristic information is characteristic information of an illegitimate installation package. The authentication server may determine whether the first installation package is an illegitimate installation package based on the characteristic information.

In Step 303, a differential package is acquired based on a difference between the illegitimate installation package corresponding to the characteristic information and a legitimate installation package corresponding to the illegitimate installation package, when it is determined that the characteristic information is the characteristic information of the illegitimate installation package. The authentication server may acquire or generate a differential package based on the difference between the illegitimate installation package and the legitimate installation package.

In Step 304, the differential package is fed back to the terminal, the differential package triggering the terminal to combine the differential package with the first installation package to obtain a combined installation package. The authentication server may send the differential package to the terminal so that the terminal may obtain a combined installation package using the differential package and the first installation package.

In short, with the methods provided in this disclosure, a differential package is acquired based on a difference between an illegitimate installation package corresponding to received characteristic information and a legitimate installation package corresponding to the illegitimate installation package. When it is determined that the received characteristic information is characteristic information of the illegitimate installation package. As such, the authentication server can feed the differential package back to a terminal which has acquired a first installation package corresponding to the differential package, and the terminal combines the differential package with the first installation package to obtain the legitimate installation package, thereby solving the problem in the prior art that a user can only download a legitimate installation package of an application again to re-install the application when the user finds that malicious codes are implanted in an installed installation package of the application. The disclosed methods achieve the following effects: an uninstalled illegitimate installation package is automatically converted into the legitimate installation package using the differential package, so that the user is saved from downloading the legitimate installation package again. Data usage for the user to acquire the legitimate installation package is saved accordingly.

In practical application, a user may download an installation package of an application from a non-official website for the application. Thus, security of the application cannot be ensured. Currently, when the user finds that malicious codes are implanted in an installed installation package of the application, the user can only download a legitimate installation package of the application again to re-install the application. To save the user from downloading the legitimate installation package again and thus save data usage for the user to acquire the legitimate installation package, the terminal according to this embodiment can automatically convert a downloaded but uninstalled installation package into the legitimate installation package using a differential package. In the following, legitimate installation package acquiring methods will be described with reference to FIGS. 4A, 4B, and 5.

Figure 4A:
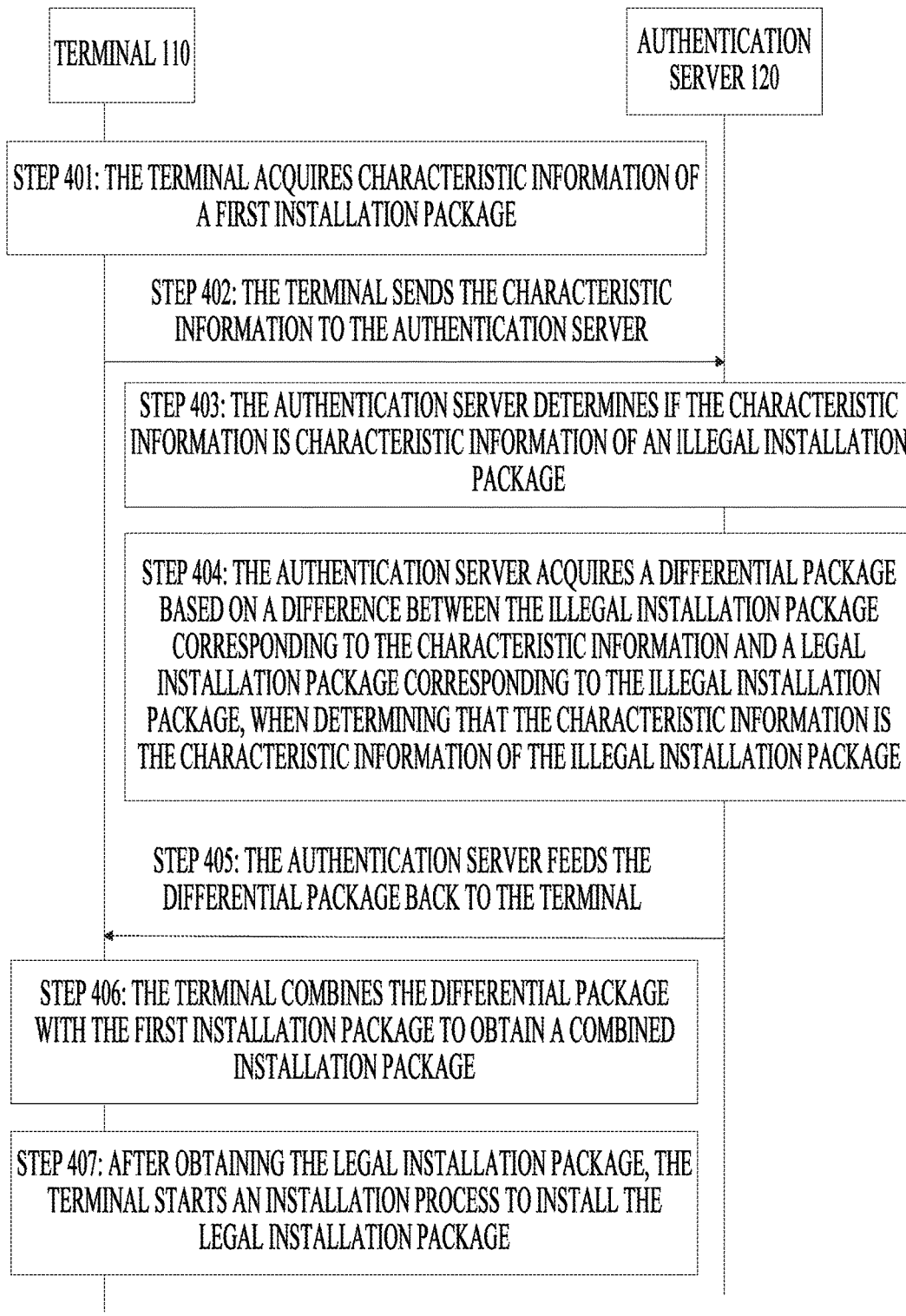
FIG. 4A is a flow chart of a method for acquiring a legitimate installation package according to yet another exemplary embodiment.

FIG. 4A is a flow chart of a legitimate installation package acquiring method according to yet another exemplary embodiment. The method may be implemented in the system environment shown in FIG. 1. As shown in FIG. 4A, the method may include the following steps 401-407.

In Step 401, a terminal acquires characteristic information of a first installation package.

The characteristic information referred to herein is used for uniquely identifying codes of the first installation package.

Alternatively or additionally, when an installation process is started to install the first installation package, the installation process is intercepted and the characteristic information of the first installation package is acquired.

To ensure the legitimacy of an installed application, when the first installation package needs to be installed, the terminal may intercept the installation process of the first installation package to be installed, analyze the first installation package and acquire the characteristic information of the first installation package.

Alternatively or additionally, the terminal may also acquire an identifier, a version number, etc. of the first installation package, in addition to the characteristic information of the first installation package.

Alternatively or additionally, a server providing the application installation package may bind the characteristic information corresponding to the first installation package with the first installation package, and provide the same to the terminal for downloading. In this way, the terminal can download the characteristic information corresponding to the first installation package when downloading the first installation package from the server.

The characteristic information is obtained after the terminal performs operations on the codes included in the first installation package according to a certain algorithm. Typically, once the codes included in the first installation package are tampered, the characteristic information corresponding to the first installation package will be changed.

For example, after the terminal performs operations on codes included in an installation package according to a Hash algorithm, a Message-Digest Algorithm 5 (MD5), or other cryptographic functions corresponding to the installation package can be obtained. The cryptographic functions such as MD5 may be used for producing a hash value indicating the characteristic information of the codes corresponding to the installation package.

In Step 402, the terminal sends the characteristic information to an authentication server.

Correspondingly, the authentication server receives the characteristic information sent by the terminal.

In Step 403, the authentication server determines whether the characteristic information is characteristic information of an illegitimate installation package.

The illegitimate installation package referred to herein refers to an installation package having malicious codes embedded therein. The malicious codes may be codes for stealing information from the terminal, for pushing advertisements to the terminal, for causing the terminal to enter abnormal states, such as system crash, white screen, automatic sending of short messages. The types and effects of the malicious codes will not be limited in this embodiment.

As the characteristic information of the first installation package can uniquely identify codes of the first installation package (that is, characteristic information of an illegitimate installation package can uniquely identify codes of the illegitimate installation package), the authentication server can determine whether the installation package corresponding to the characteristic information is an illegitimate installation package, by determining whether the characteristic information is characteristic information of an illegitimate installation package.

Figure 4B:
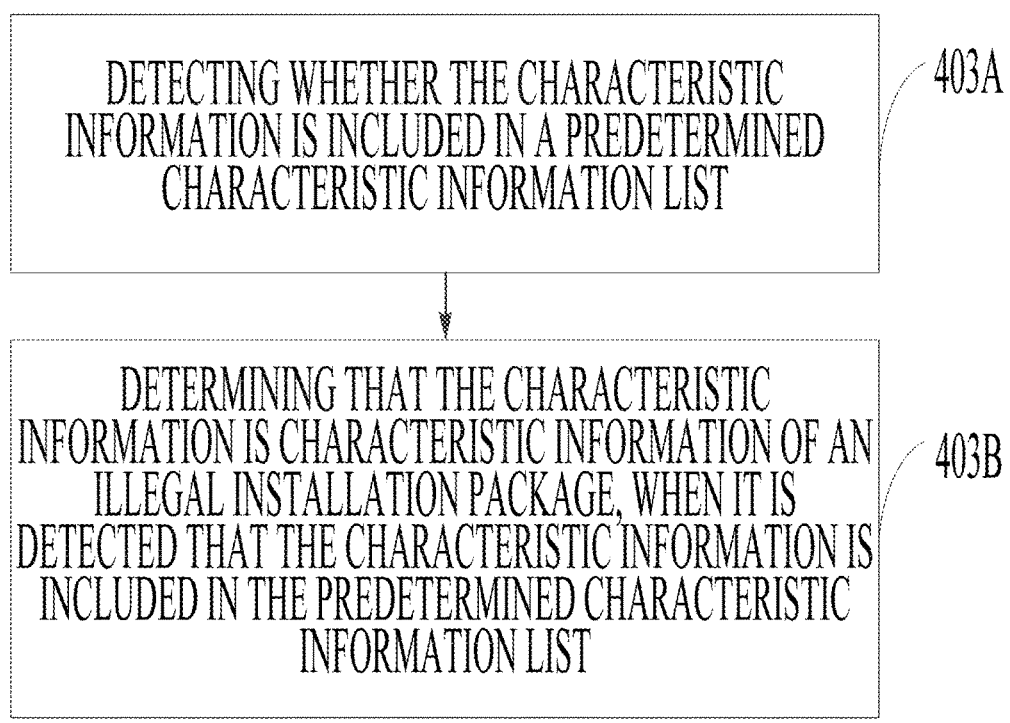
FIG. 4B is a flow chart of a method of determining if characteristic information is characteristic information of an illegitimate installation package according to an exemplary embodiment.

FIG. 4B is a flow chart of a method of determining whether the characteristic information is characteristic information of an illegitimate installation package according to an exemplary embodiment. As shown in FIG. 4B, the method may be implemented by steps 403a-403b.

In Step 403a, it is determined whether the characteristic information is included in a predetermined characteristic information list.

The authentication server pre-stores a predetermined characteristic information list, which stores characteristic information of illegitimate installation packages. Here, the predetermined characteristic information list may be stored locally or remotely accessible to the authentication server. When receiving the characteristic information sent by the terminal, the authentication server can determine whether the characteristic information is characteristic information of an illegitimate installation package by detecting whether the characteristic information is included in the predetermined characteristic information list.

In Step 403b, it is determined that the characteristic information is characteristic information of an illegitimate installation package, when the characteristic information is included in the predetermined characteristic information list.

When determining that the characteristic information is characteristic information of an illegitimate installation package, the authentication server can determine that the first installation package corresponding to the characteristic information is an illegitimate installation package.

In Step 404, the authentication server acquires a differential package based on a difference between the illegitimate installation package corresponding to the characteristic information and a legitimate installation package corresponding to the illegitimate installation package, when determining that the characteristic information is the characteristic information of the illegitimate installation package.

The differential package referred to herein is a difference between an illegitimate installation package including the characteristic information and acquired by the authentication server and a legitimate installation package corresponding to the illegitimate installation package.

The legitimate installation package referred to herein refers to an installation package in which no malicious code is embedded.

If it provides differential package resources, the authentication server may acquire a differential package locally based on a difference between the illegitimate installation package corresponding to the characteristic information and a legitimate installation package corresponding to the illegitimate installation package. If it does not provide differential package resources, the authentication server may acquire the differential package from another authentication server based on the difference between the illegitimate installation package corresponding to the characteristic information and the legitimate installation package corresponding to the illegitimate installation package.

The other authentication server referred to herein is an authentication server providing differential package resources.

Alternatively or additionally, after determining that the characteristic information is characteristic information of an illegitimate installation package, the authentication server may send a prompt message to the terminal triggering the terminal to display prompt information, which informs the user of an abnormal state of the first installation package corresponding to the characteristic information.

In Step 405, the authentication server feeds the differential package back to the terminal.

Alternatively or additionally, before feeding the differential package back to the terminal, the authentication server may send a prompt message to the terminal triggering the terminal to display prompt information, the prompt information may request the user to confirm whether the user agrees to acquire the differential package.

Correspondingly, the terminal receives the differential package fed back by the authentication server.

In Step 406, the terminal combines the differential package with the first installation package to obtain a combined installation package.

The process of combining the differential package with the first installation package may include a process of combining codes in the differential package with codes in the first installation package. For example, there may be at least the following cases for the terminal to combine the differential package with the first installation package.

First case: the differential package includes a first code segment, while the first installation package does not include the first code segment.

Second case: the first installation package includes a second code segment, while the differential package does not include the second code segment.

For the above two cases, when combining the differential package and the first installation package, the terminal may adopt the following combining methods, respectively.

For the first case, in combining the differential package and the first installation package, the terminal may add the first code segment in the differential package into the first installation package.

For the second case, in combining the differential package and the downloaded installation package to be installed, the terminal may delete the second code segment from the first installation package.

In Step 407, after obtaining the legitimate installation package, the terminal starts an installation process to install the legitimate installation package.

After obtaining the combined installation package by combining the differential package acquired from the authentication server with the acquired first installation package, the terminal may start an installation process to install the legitimate installation package. The application obtained after the legitimate installation package is installed is a legitimate application.

In this disclosure, methods and devices are provided for acquiring a legitimate installation package. In the method, characteristic information of a first installation package is sent to an authentication server. When a differential installation package fed back by the authentication server based on the characteristic information of the first installation package is received, the differential package is combined with the first installation package to obtain a legitimate installation package. As such, the terminal may convert the first installation package into the legitimate installation package using the differential package, thereby solving the problem in the prior art that a user can only download a legitimate installation package of an application again to re-install the application when the user finds that malicious codes are implanted in an installed installation package of the application. The methods and devices achieve the following effects: an uninstalled illegitimate installation package is automatically converted into the legitimate installation package using the differential package, so that the user is saved from downloading the legitimate installation package again. Thus, data usage and time for the user to acquire the legitimate installation package are reduced accordingly.

In one or more embodiments, as the predetermined characteristic information list stores characteristic information of illegitimate installation packages, it can be effectively determined whether the characteristic information is characteristic information of an illegitimate installation package, by detecting whether the characteristic information sent by the terminal is included in the predetermined characteristic information list.

Figure 5:
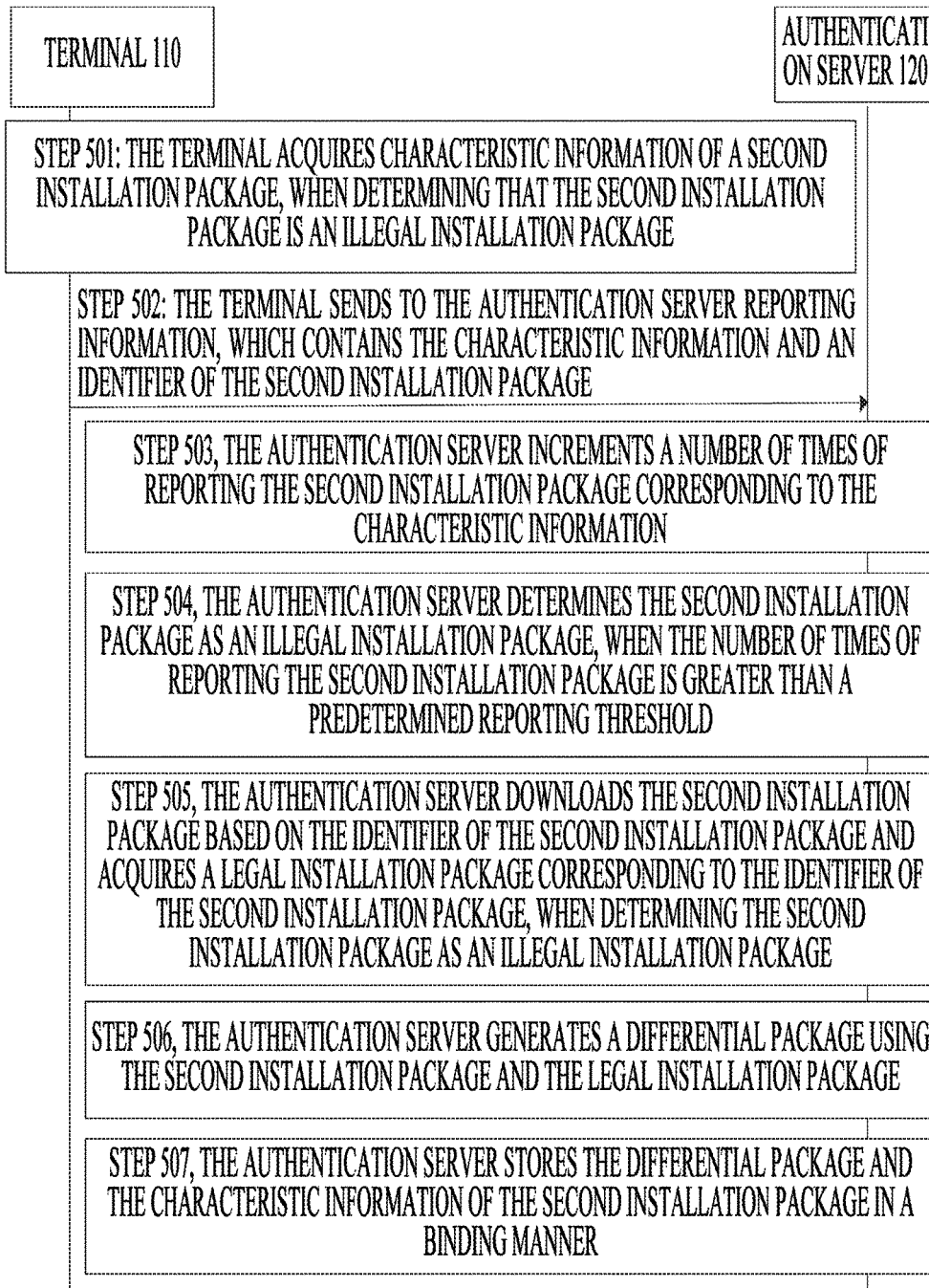
FIG. 5 is a flow chart of a method of generating a differential package according to an exemplary embodiment.

In a possible implementation, when a user finds that an installed application is an illegitimate one, the user may send reporting information to an authentication server using his/her terminal. The authentication server increments a number of times of reporting a second installation package, and determines the second installation package as an illegitimate installation package and generates a differential package corresponding to the second installation package when the number of times of reporting the second installation package is greater than a predetermined reporting threshold. FIG. 5 is a flow chart of a method of generating a differential package according to an exemplary embodiment. The method is implemented in the implementation environment shown in FIG. 1, and includes the following steps 501-507 as shown in FIG. 5.

In step 501, a terminal acquires characteristic information of a second installation package, when determining that the second installation package is an illegitimate installation package.

After installing an installation package of an application, the terminal or its user may determine that the installation package is an illegitimate installation package and acquire characteristic information of the illegitimate installation package, if advertisements are frequently pushed to the terminal or the terminal encounters abnormalities such as system crash, white screen, automatically sending short messages.

In step 502, the terminal sends to an authentication server reporting information, which includes the characteristic information and an identifier of the second installation package.

Alternatively or additionally, the reporting information further includes a download address of the second installation package, the download address triggering the authentication server to download the second installation package using the download address and generate a differential package using the downloaded second installation package and a legitimate installation package corresponding to the second installation package when determining the second installation package as an illegitimate installation package.

Correspondingly, the authentication server receives the reporting information for the second installation package of the application, which is sent by the terminal.

In step 503, the authentication server increments a number of times of reporting the second installation package corresponding to the characteristic information.

For example, when receiving the reporting information for the second installation package ABC for the first time, the authentication server sets the number of times of reporting the second installation package ABC as 1. If the reporting information for the second installation package ABC is received again, the authentication server increments the number of times of reporting the second installation package ABC by one, and so on.

In step 504, the authentication server determines the second installation package as an illegitimate installation package, when the number of times of reporting the second installation package is greater than a predetermined reporting threshold.

When the number of times of reporting the second installation package is greater than the predetermined reporting threshold, it means that multiple terminals report the second installation package to the authentication server. Then, the authentication server may determine the second installation package as an illegitimate installation package.

In step 505, the authentication server downloads the second installation package based on the identifier of the second installation package and acquires a legitimate installation package corresponding to the identifier of the second installation package, when determining the second installation package as an illegitimate installation package.

The authentication server may or may not store legitimate installation package resources locally. When the authentication server stores legitimate installation package resources locally, the authentication server may find and acquire a legitimate installation package corresponding to the identifier of the installation package locally based on the identifier of the second installation package. When the authentication server does not store legitimate installation package resources locally, the authentication server may find and acquire the legitimate installation package corresponding to the identifier of the installation package from another authentication server based on the identifier of the second installation package. The other authentication server referred to herein may be an authentication server that dedicatedly provides legitimate installation package resources of applications or an official authentication server for the application corresponding to the identifier of the second installation package.

Alternatively or additionally, the reporting information further includes a download address of the second installation package, and the authentication server can download the second installation package based on the download address.

Alternatively or additionally, the legitimate installation package corresponding to the identifier of the installation package is the highest version of the legitimate installation package corresponding to the identifier of the second installation package.

In step 506, the authentication server generates a differential package using the second installation package and the legitimate installation package.

After the authentication server downloads the second installation package and acquires the legitimate installation package corresponding to the second installation package, the authentication server analyzes the second installation package and the legitimate installation package corresponding to the second installation package, compares codes of the second installation package with codes of the legitimate installation package corresponding to the second installation package to obtain a difference between the second installation package and the legitimate installation package corresponding to the second installation package, and generates a differential package using the difference.

Alternatively or additionally, the authentication server stores the generated differential package or sends it to an authentication server in a network of a content delivery network (CDN) type.

In step 507, the authentication server stores the differential package and the characteristic information of the second installation package in a binding manner.

The authentication server stores the differential package and the characteristic information of the second installation package in a binding manner, so that the authentication server can find the differential package corresponding to the characteristic information of the second installation package based on the characteristic information when the terminal sends the characteristic information to the authentication server.

In one or more embodiments, when determining that the second installation package is an illegitimate installation package, the terminal sends reporting information, which includes the characteristic information of the second installation package and an identifier of the second installation package, to the authentication server. After the terminal reports the characteristic information and the identifier of the second installation package to the authentication server, the authentication server will be triggered to increment a number of times of reporting the second installation package and to determine if the second installation package is an illegitimate installation package, thereby making the determination of the illegitimate installation package more accurate.

In one or more embodiments, the reporting information includes a download address of the installation package to be reported, so as to trigger the authentication server to download the second installation package using the download address when determining the second installation package as an illegitimate installation package, thereby effectively saving the authentication server from looking for the installation package to be reported.

In one or more embodiments, by incrementing a number of times of reporting the second installation package and by determining the second installation package as an illegitimate installation package when the number of times of reporting the second installation package is greater than the predetermined reporting threshold, the authentication server can be prevented from falsely determining a legitimate installation package as an illegitimate installation package.

In one or more embodiments, by generating a differential package using the second installation package and the legitimate installation package and by storing the differential package and the characteristic information of the second installation package in a binding manner so that the differential package corresponds to the characteristic information of the second installation package, the authentication server can feed the differential package corresponding to the characteristic information back to the terminal sending the characteristic information when it receives the characteristic information sent by the terminal.

The followings are apparatus embodiments of the present disclosure, which may be configured to perform the method embodiments of the present disclosure. For details that are not disclosed in the apparatus embodiments of the present disclosure, reference can be made to the method embodiments of the present disclosure.

Figure 6A:
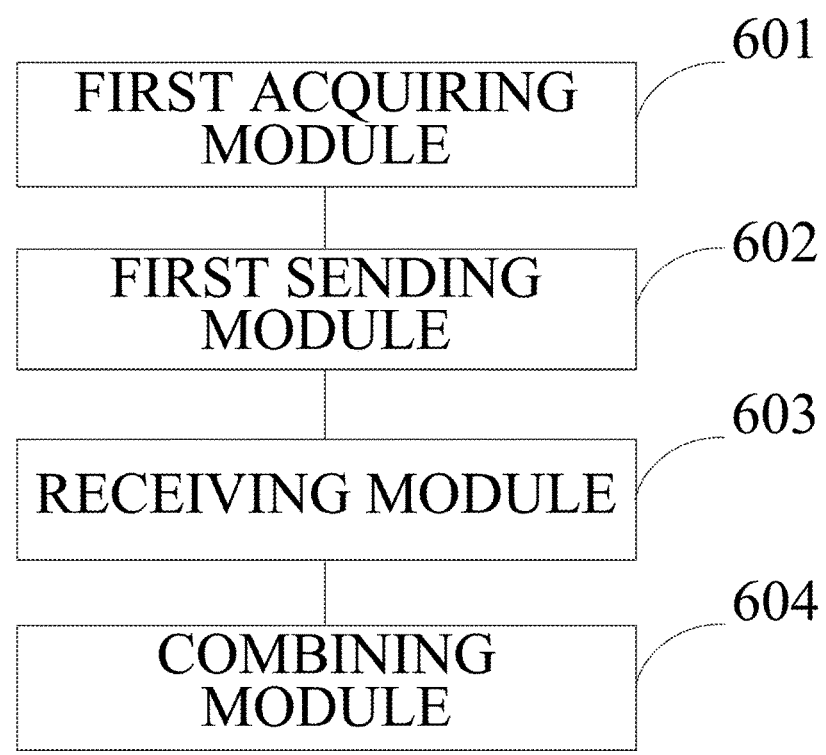
FIG. 6A is a block diagram of a legitimate installation package acquiring apparatus according to an exemplary embodiment.

FIG. 6A is a block diagram of a legitimate installation package acquiring apparatus according to an exemplary embodiment. As shown in FIG. 6A, the apparatus is implemented in the terminal 110 shown in FIG. 1, and includes but is not limited to a first acquiring module 601, a first sending module 602, a receiving module 603 and a combining module 604.

The first acquiring module 601 is configured to acquire characteristic information of a first installation package, the characteristic information uniquely identifying codes of the first installation package.

The characteristic information referred to herein is used for uniquely identifying codes of the first installation package.

Alternatively or additionally, the terminal may also acquire an identifier, a version number, etc. of the first installation package, in addition to the characteristic information of the first installation package.

Alternatively or additionally, a server providing the application installation package may bind the characteristic information corresponding to the first installation package with the first installation package, and provide the same to the terminal for downloading. In this way, the terminal can download the characteristic information corresponding to the first installation package when downloading the first installation package from the server.

The characteristic information is obtained after the terminal performs operations on the codes included in the first installation package according to a certain algorithm. Typically, once the codes included in the first installation package are tampered, the characteristic information corresponding to the first installation package will be changed.

For example, after the terminal performs calculations to the code included in an installation package according to a Hash algorithm, a Message-Digest Algorithm 5 (MD5) corresponding to the installation package can be obtained. The MD5 is the characteristic information of the codes corresponding to the installation package.

The first sending module 602 is configured to send the characteristic information acquired by the first acquiring module 601 to an authentication server, the characteristic information triggering the authentication server to feed back to the terminal a differential package corresponding to the characteristic information when the authentication server determines that the first installation package is an illegitimate installation package based on the characteristic information.

The receiving module 603 is configured to receive the differential package fed back by the authentication server, the differential package including a difference between the illegitimate installation package and a legitimate installation package corresponding to the illegitimate installation package.

The combining module 604 is configured to combine the differential package received by the receiving module 603 with the first installation package to obtain the legitimate installation package.

The process of combining the differential package with the first installation package may include a process of combining codes included in the differential package with codes in the first installation package.

Figure 6B:
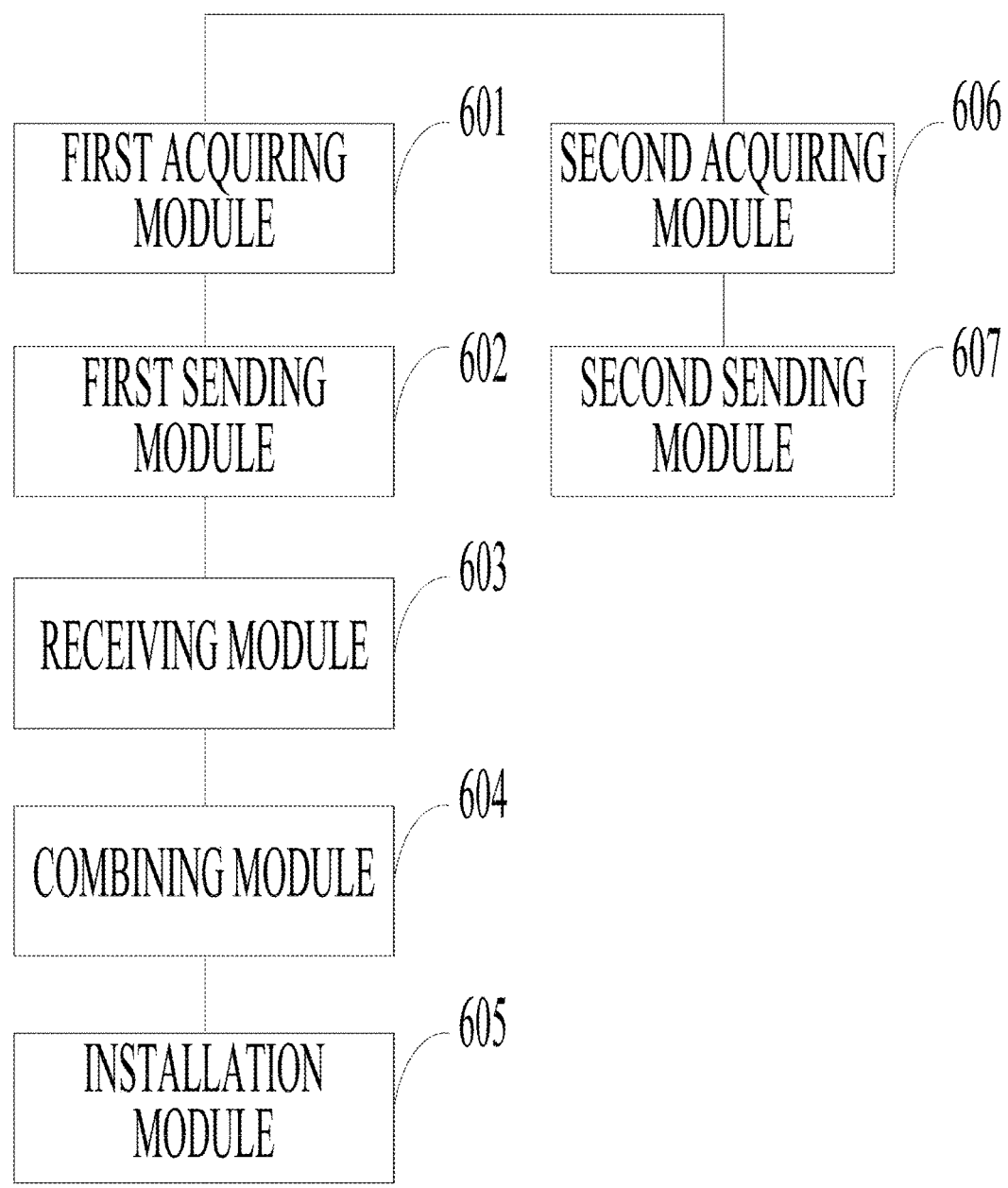
FIG. 6B is a block diagram of a legitimate installation package acquiring apparatus according to another exemplary embodiment.

In a possible implementation, referring to FIG. 6B, which is a block diagram of a legitimate installation package acquiring apparatus according to another exemplary embodiment, the apparatus is implemented in the terminal 110 shown in FIG. 1, and the first acquiring module 601 is configured to: when an installation process is started to install the first installation package, intercept the installation process and acquire the characteristic information of the first installation package.

As the downloaded installation package to be installed is not necessarily legitimate, in order to ensure the legitimacy of an installed application, automatic installation of the installation package after downloading should be avoided here, or the installation package should be installed after the user's confirmation. In practical application, when an installation package needs to be installed, the terminal may intercept the installation process of the installation package to be installed, analyze the installation package and acquire the characteristic information of the installation package.

In a possible implementation, referring still to FIG. 6B, the apparatus further includes an installation module 605 configured to, after the legitimate installation package is obtained through combination by the combining module, start the installation process to install the legitimate installation package.

After obtaining the combined installation package by combining the differential package acquired from the authentication server with the acquired first installation package, the terminal may start an installation process to install the legitimate installation package. The application obtained after the legitimate installation package is installed is a legitimate application.

In a possible implementation, referring still to FIG. 6B, the apparatus may further include a second acquiring module 606 and a second sending module 607.

The second acquiring module 606 is configured to acquire characteristic information of a second installation package when it is determined that the second installation package is an illegitimate installation package.

After installing an installation package of an application, the terminal or its user may determine that the installation package is an illegitimate installation package and acquire characteristic information of the illegitimate installation package, if advertisements are frequently pushed to the terminal or the terminal encounters abnormalities such as system crash, white screen, automatically sending short messages.

The second sending module 607 is configured to send reporting information, which includes the characteristic information acquired by the second acquiring module and an identifier of the second installation package, to the authentication server, the reporting information triggering the authentication server to increment a number of times of reporting the second installation package corresponding to the characteristic information and to determine the second installation package corresponding to the characteristic information as an illegitimate installation package when the number of times of reporting is greater than a predetermined reporting threshold.

Alternatively or additionally, the reporting information further includes a download address of the second installation package, the download address triggering the authentication server to download the second installation package using the download address and generate a differential package using the downloaded second installation package and a legitimate installation package corresponding to the second installation package when determining the second installation package as an illegitimate installation package.

Correspondingly, the authentication server receives the reporting information for the installation package of the application, which is sent by the terminal.

To sum up, apparatuses are provided for acquiring a legitimate installation package in this disclosure. The apparatuses may send characteristic information of a first installation package to an authentication server. When a differential installation package fed back by the authentication server based on the characteristic information of the first installation package is received, the apparatuses combines the differential package with the first installation package to obtain a legitimate installation package. As such, the apparatuses may convert the first installation package into the legitimate installation package using the differential package, thereby solving the problem in the prior art that a user can only download a legitimate installation package of an application again to re-install the application when the user finds that malicious codes are implanted in an installed installation package of the application. The disclosed apparatuses achieve the following effects: an uninstalled illegitimate installation package is automatically converted into the legitimate installation package using the differential package, so that the user is saved from downloading the legitimate installation package again. Further, data usage and time are reduced for the user to acquire the legitimate installation package after identifying that the malicious codes are implanted in the downloaded package.

In one or more embodiments, when determining that the second installation package is an illegitimate installation package, the terminal sends reporting information, which includes the characteristic information of the second installation package and an identifier of the second installation package, to the authentication server. After the terminal reports the characteristic information and the identifier of the second installation package to the authentication server, the authentication server will be triggered to increment a number of times of reporting the second installation package and to determine if the second installation package is an illegitimate installation package, thereby making the determination of the illegitimate installation package more accurate.

In one or more embodiments, the reporting information includes a download address of the installation package to be reported, so as to trigger the authentication server to download the second installation package using the download address when determining the second installation package as an illegitimate installation package, thereby effectively saving the authentication server from looking for the installation package to be reported.

Figure 7A:
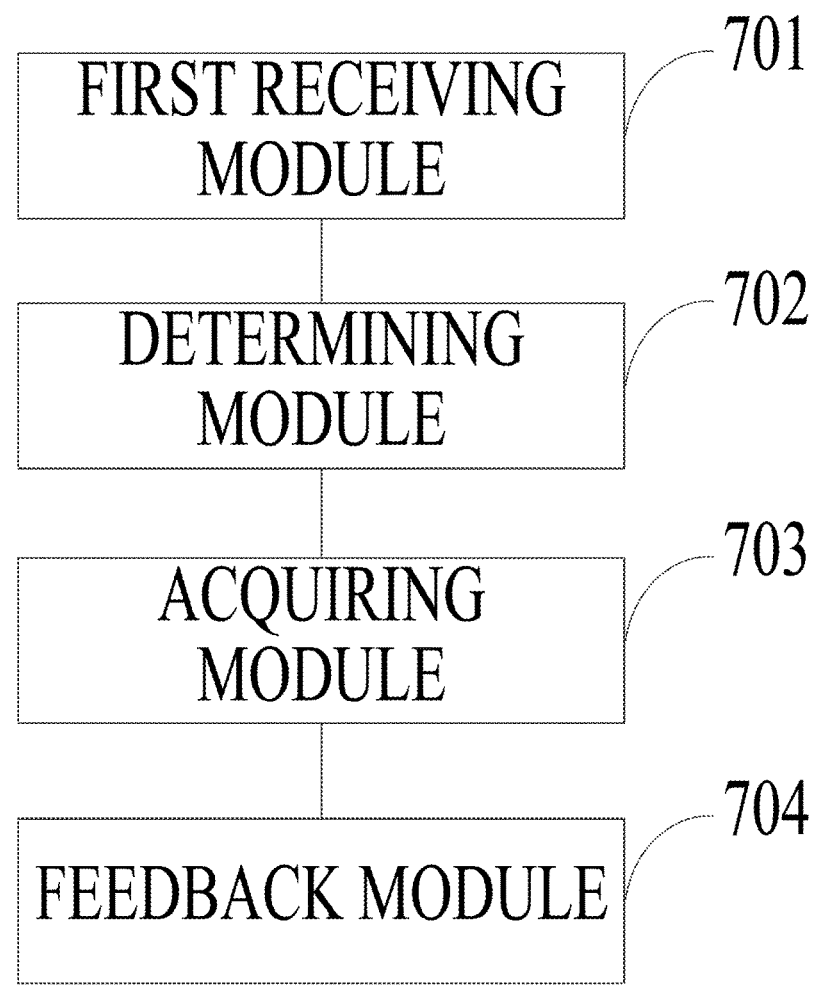
FIG. 7A is a block diagram of a legitimate installation package acquiring apparatus according to yet another exemplary embodiment.

FIG. 7A is a block diagram of a legitimate installation package acquiring apparatus according to yet another exemplary embodiment. As shown in FIG. 7A, the apparatus is implemented in an authentication server 120 shown in FIG. 1, and includes but is not limited to a first receiving module 701, a determining module 702, an acquiring module 703 and a feedback module 704.

The first receiving module 701 is configured to receive characteristic information sent by a terminal, the characteristic information being generated by the terminal based on an acquired first installation package and uniquely identifying codes of the first installation package.

The determining module 702 is configured to determine whether the characteristic information received by the first receiving module 701 is characteristic information of an illegitimate installation package.

The illegitimate installation package referred to herein refers to an installation package having malicious codes embedded therein. The malicious codes may be codes for stealing information from the terminal, for pushing advertisements to the terminal, for causing the terminal to enter abnormal states such as system crash, white screen, automatic sending of short messages. The types and effects of the malicious codes will not be limited in this embodiment.

As the characteristic information of the first installation package can uniquely identify codes of the first installation package (that is, the characteristic information of an illegitimate installation package can uniquely identify codes of the illegitimate installation package), the authentication server can determine if the installation package corresponding to the characteristic information is an illegitimate installation package, by determining whether the characteristic information is the characteristic information of an illegitimate installation package.

The acquiring module 703 is configured to acquire a differential package based on a difference between the illegitimate installation package corresponding to the characteristic information and a legitimate installation package corresponding to the illegitimate installation package, when the determining module 702 determines that the characteristic information is the characteristic information of the illegitimate installation package.

The differential package referred to herein is a difference between an illegitimate installation package including the characteristic information and acquired by the authentication server and a legitimate installation package corresponding to the illegitimate installation package.

The legitimate installation package referred to herein refers to an installation package in which no malicious codes is embedded.

When the authentication server provides differential package resources, the authentication server may acquire a differential package locally based on a difference between the illegitimate installation package corresponding to the characteristic information and a legitimate installation package corresponding to the illegitimate installation package. When the authentication server does not provide differential package resources, the authentication server may acquire the differential package from another authentication server based on the difference between the illegitimate installation package corresponding to the characteristic information and the legitimate installation package corresponding to the illegitimate installation package.

The other authentication server referred to herein is an authentication server providing differential package resources.

Alternatively or additionally, after determining that the characteristic information is characteristic information of an illegitimate installation package, the authentication server may send a prompt message to the terminal triggering the terminal to display prompt information, which informs the user of an abnormal state of the first installation package corresponding to the characteristic information.

The feedback module 704 is configured to feed the differential package acquired by the acquiring module 703 back to the terminal, the differential package triggering the terminal to combine the differential package with the first installation package to obtain a combined installation package.

Figure 7B:
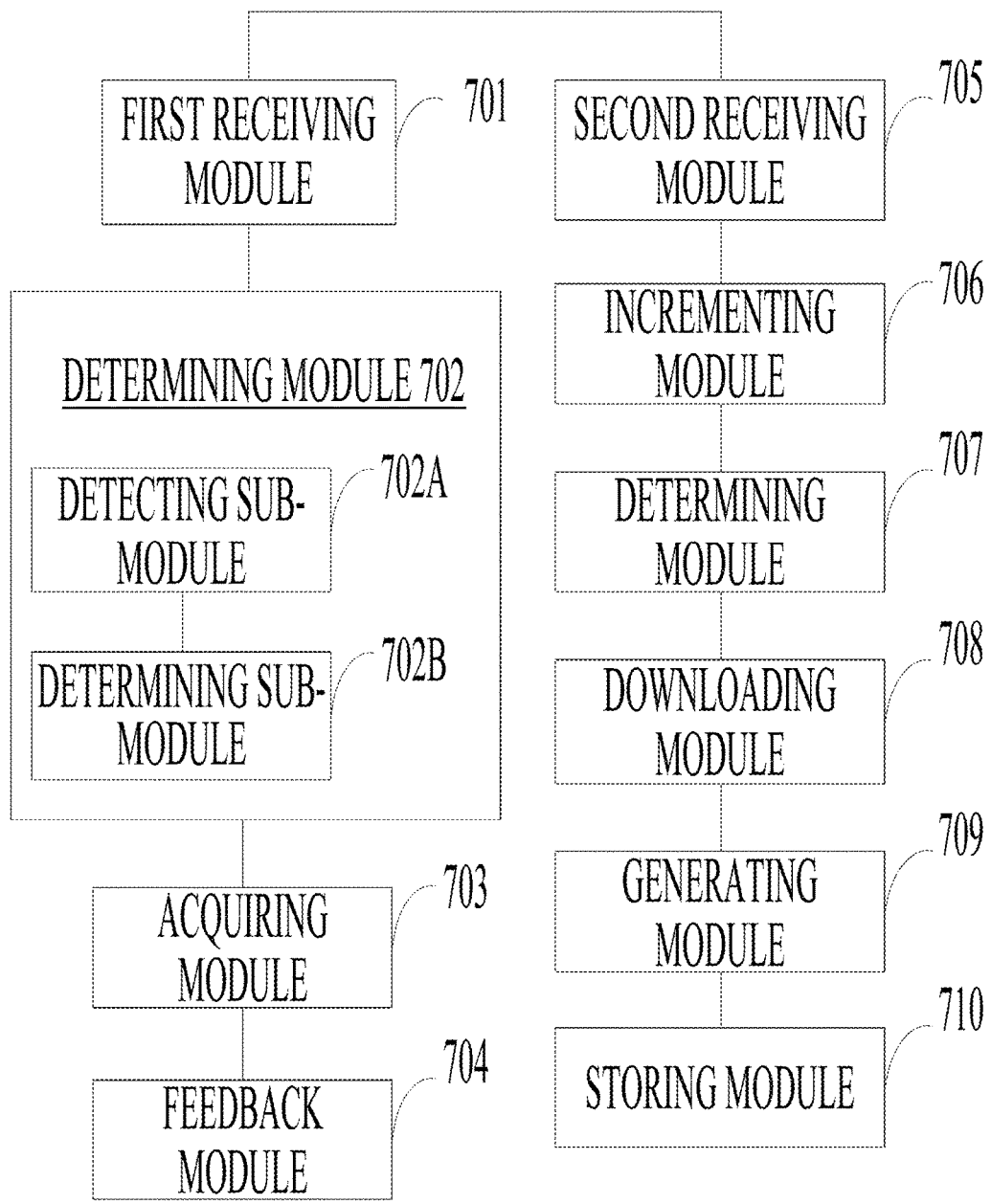
FIG. 7B is a block diagram of a legitimate installation package acquiring apparatus according to still another exemplary embodiment.

In a possible implementation, referring to FIG. 7B, which is a block diagram of a legitimate installation package acquiring apparatus according to yet another exemplary embodiment, the apparatus is implemented in the authentication server 120 shown in FIG. 1, and the determining module 702 includes a detecting sub-module 702a and a determining sub-module 702b.

The detecting sub-module 702a is configured to determine whether the characteristic information is included in a predetermined characteristic information list storing characteristic information of illegitimate installation packages.

The authentication server pre-stores a predetermined characteristic information list. When receiving the characteristic information sent by the terminal, the authentication server can determine whether the characteristic information is characteristic information of an illegitimate installation package by detecting whether the characteristic information is included in the predetermined characteristic information list.

The determining sub-module 702b is configured to determine that the characteristic information is characteristic information of an illegitimate installation package, when the detecting sub-module 702a detects that the characteristic information is included in the predetermined characteristic information list.

When the authentication server determines that the characteristic information is characteristic information of an illegitimate installation package, it can determine the first installation package corresponding to the characteristic information as an illegitimate installation package.

In an implementation, still referring to FIG. 7B, the apparatus further includes a second receiving module 705, an incrementing module 706 and a determining module 707.

The second receiving module 705 is configured to receive reporting information for a second installation package sent by the terminal, the reporting information including an identifier of the second installation package and characteristic information of the second installation package, and the identifier of the second installation package uniquely identifying an application corresponding to the second installation package.

The incrementing module 706 is configured to increment a number of times of reporting the second installation package corresponding to the characteristic information.

The determining module 707 is configured to determine the second installation package as an illegitimate installation package, when the number of times of reporting the second installation package is greater than a predetermined reporting threshold.

When the number of times of reporting the second installation package is greater than the predetermined reporting threshold, it means that multiple terminals report the second installation package to the authentication server. Then, the authentication server may determine the second installation package as an illegitimate installation package.

In a possible implementation, still referring to FIG. 7B, the apparatus further includes: a downloading module 708, a generating module 709 and a storing module 710.

The downloading module 708 is configured to download a second installation package based on an identifier of the second installation package and acquire a legitimate installation package corresponding to the identifier of the second installation package, when the second installation package is determined as an illegitimate installation package.

The authentication server may or may not provide legitimate installation package resources. If it provides legitimate installation package resources, the authentication server may find and acquire a legitimate installation package corresponding to the identifier of the installation package locally based on the identifier of the second installation package. If it does not provide legitimate installation package resources, the authentication server may find and acquire the legitimate installation package corresponding to the identifier of the installation package from another authentication server based on the identifier of the second installation package. The other authentication server referred to herein may be an authentication server that dedicatedly provides legitimate installation package resources of applications or an official authentication server for the application corresponding to the identifier of the second installation package.

Alternatively or additionally, the reporting information further includes a download address of the second installation package, and the authentication server can download the second installation package based on the download address.

Alternatively or additionally, the legitimate installation package corresponding to the identifier of the installation package is the highest version of the legitimate installation package corresponding to the identifier of the second installation package.

The generating module 709 is configured to generate a differential package using the second installation package and the legitimate installation package downloaded by the downloading module 708.

After the authentication server downloads the second installation package and acquires the legitimate installation package corresponding to the second installation package, the authentication server analyzes the second installation package and the legitimate installation package corresponding to the second installation package, compares codes of the second installation package with codes of the legitimate installation package corresponding to the second installation package to obtain a difference between the second installation package and the legitimate installation package corresponding to the second installation package, and generates a differential package using the difference.

Alternatively or additionally, the authentication server stores the generated differential package or sends it to an authentication server in a network of a content delivery network (CDN) type.

The storing module 710 is configured to store the differential package generated by the generating module 709 and characteristic information of the second installation package in a binding manner.

The authentication server stores the differential package and the characteristic information of the second installation package in a binding manner, so that the authentication server can find the differential package corresponding to the characteristic information of the second installation package based on the characteristic information when the terminal sends the characteristic information to the authentication server.

In a possible implementation, still referring to FIG. 7B, the reporting information further includes a download address of the second installation package, and the downloading module 708 is configured to download the second installation package based on the download address.

In a possible implementation, the legitimate installation package corresponding to the identifier of the installation package is the highest version of the legitimate installation package corresponding to the identifier of the second installation package.

To sum up, the disclosure provides an apparatus for acquiring the legitimate installation package. The apparatus acquires a differential package based on a difference between an illegitimate installation package corresponding to the received characteristic information and a legitimate installation package corresponding to the illegitimate installation package. As such, the authentication server can feed the differential package back to a terminal which has acquired an installation package associated with the differential package, thereby solving the problem in the prior art that a user can only download a legitimate installation package of an application again to re-install the application when the user finds that malicious codes are implanted in an installed installation package of the application. The disclosed apparatus achieves the following effects: an uninstalled illegitimate installation package is automatically converted into the legitimate installation package using the differential package, so that the user is saved from downloading the legitimate installation package again. Further, data usage and waiting time for the user to acquire and install the legitimate installation package is reduced accordingly.

Here, as the predetermined characteristic information list stores characteristic information of illegitimate installation packages, it can be effectively determined whether the characteristic information is characteristic information of an illegitimate installation package, by determining whether the characteristic information sent by the terminal is included in the predetermined characteristic information list.

Here, by incrementing a number of times of reporting the second installation package and by determining the second installation package as an illegitimate installation package when the number of times of reporting the second installation package is greater than the predetermined reporting threshold, the authentication server can be prevented from falsely determining a legitimate installation package as an illegitimate installation package.

Here, by generating a differential package using the second installation package and the legitimate installation package and by storing the differential package and the characteristic information of the second installation package in a binding manner so that the differential package corresponds to the characteristic information of the second installation package, the authentication server can feed the differential package corresponding to the characteristic information back to the terminal sending the characteristic information when it receives the characteristic information sent by the terminal.

An exemplary embodiment of this disclosure provides a legitimate installation package acquiring system including at least one terminal and an authentication server.

The terminal may include the legitimate installation package acquiring apparatus according to any of the possible implementations shown in FIGS. 6A-6B. For details, reference can be made to descriptions for FIGS. 6A-6B, and no description for the details will be given here redundantly.

The authentication server may include the legitimate installation package acquiring apparatus according to any of the possible implementations shown in FIGS. 7A-7B. For details, reference can be made to descriptions for FIGS. 7A-7B, and no description for the details will be given here redundantly.

To sum up, with the legitimate installation package acquiring system provided in this embodiment of this disclosure, characteristic information of a first installation package is sent to an authentication server; and when a differential installation package fed back by the authentication server based on the characteristic information of the first installation package is received, the differential package is combined with the first installation package to obtain a legitimate installation package. As such, the terminal can convert the first installation package into the legitimate installation package using the differential package, thereby solving the problem in the prior art that a user can only download a legitimate installation package of an application again to re-install the application when the user finds that malicious codes are implanted in an installed installation package of the application, and achieving the following effects: an uninstalled illegitimate installation package is automatically converted into the legitimate installation package using the differential package, so that the user is saved from downloading the legitimate installation package again and traffic for the user to acquire the legitimate installation package is saved accordingly.

An exemplary embodiment of this disclosure provides a legitimate installation package acquiring apparatus, which can implement the legitimate installation package acquiring method executed by a terminal according to this disclosure. The apparatus may be implemented in the terminal 110 shown in FIG. 1, and includes: a processor; and a memory configured to store instructions executable by the processor. The processor is configured to: acquire characteristic information of a first installation package, the characteristic information uniquely identifying codes of the first installation package; send the characteristic information to an authentication server, the characteristic information triggering the authentication server to feed back to the terminal a differential package corresponding to the characteristic information when the authentication server determines that the first installation package is an illegitimate installation package based on the characteristic information; receive the differential package fed back by the authentication server, the differential package including a difference between the illegitimate installation package and a legitimate installation package corresponding to the illegitimate installation package; and combine the differential package with the first installation package to obtain the legitimate installation package.

Another exemplary embodiment of this disclosure provides a legitimate installation package acquiring apparatus, which can implement the legitimate installation package acquiring method executed by an authentication server according to this disclosure. The apparatus may be implemented in the authentication server 120 shown in FIG. 1, and includes: a processor; and a memory configured to store instructions executable by the processor. The processor is configured to: receive characteristic information sent by a terminal, the characteristic information being generated by the terminal based on an acquired first installation package and uniquely identifying codes of the first installation package; determine whether the characteristic information is characteristic information of an illegitimate installation package; acquire a differential package based on a difference between the illegitimate installation package corresponding to the characteristic information and a legitimate installation package corresponding to the illegitimate installation package, when determining that the characteristic information is the characteristic information of the illegitimate installation package; and feed the differential package back to the terminal, the differential package triggering the terminal to combine the differential package with the first installation package to obtain a combined installation package.

Figure 8:
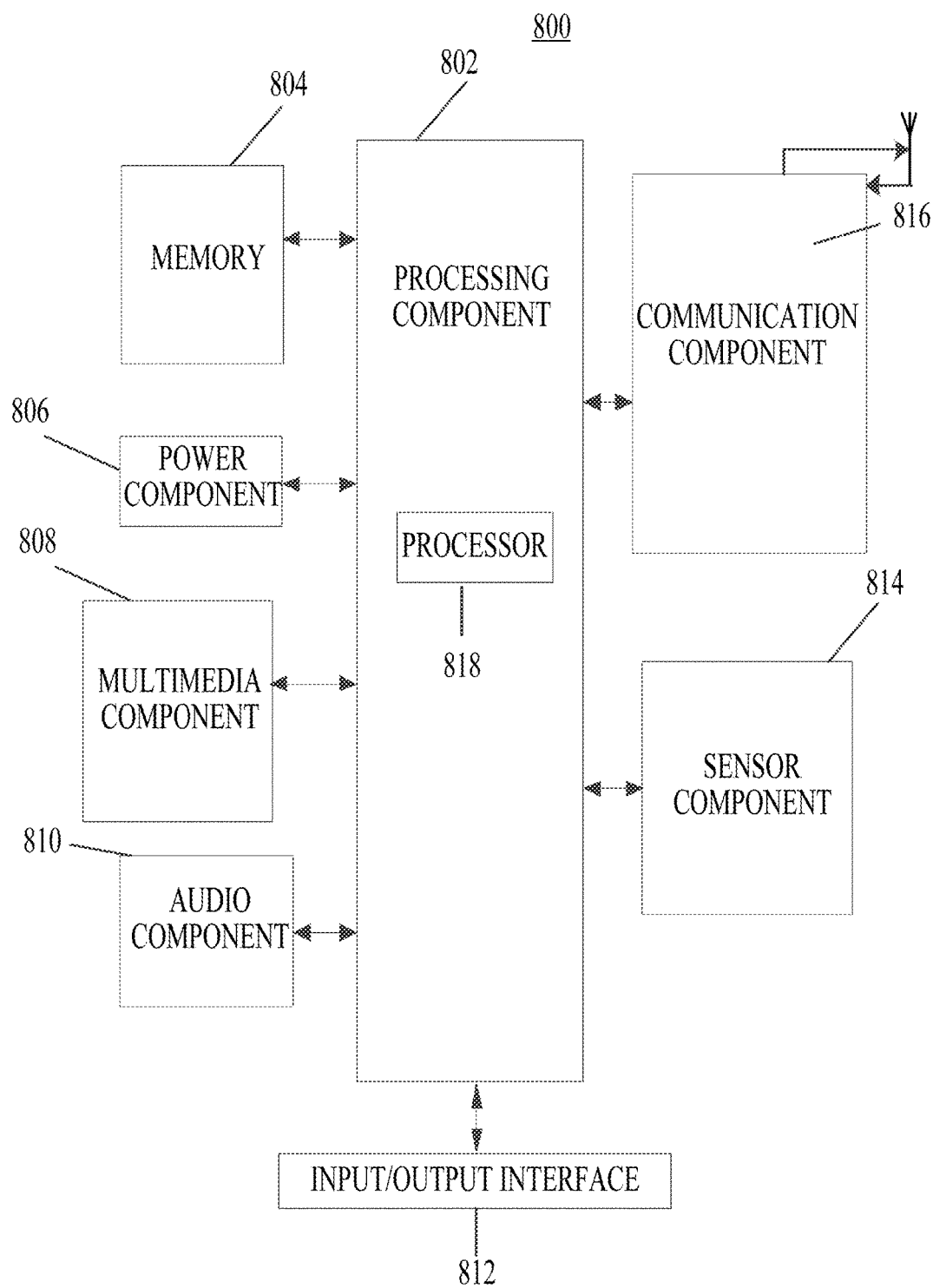
FIG. 8 is a block diagram of a legitimate installation package acquiring apparatus according to an exemplary embodiment.

FIG. 8 is a block diagram of a legitimate installation package acquiring apparatus 800 according to an exemplary embodiment. For example, the apparatus 800 may be a mobile phone, a computer, a digital broadcast terminal, a message transceiver device, a game console, a tablet device, a medical device, fitness equipment, a personal digital assistant or the like.

Referring to FIG. 8, the apparatus 800 may include one or more following components: a processing component 802, a memory 804, a power component 806, a multimedia component 808, an audio component 810, an input/output (I/O) interface 812, a sensor component 814 and a communication component 816.

The processing component 802 typically controls overall operations of the apparatus 800, such as the operations associated with display, telephone calls, data communications, camera operations and recording operations. The processing component 802 may include one or more processors 820 to execute instructions to perform all or part of the steps in the above described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, various kinds of data, messages, pictures, video, etc. The memory 804 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components corresponding to the generation, management, and distribution of power in the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure corresponding to the touch or swipe action. In some embodiments, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, presence or absence of user's contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor or a temperature sensor.

The communication component 816 is configured to facilitate communication, wired or wirelessly, between the apparatus 800 and other devices. The apparatus 800 can access a wireless network based on a communication standard, such as WiFi, 2G; or 3G; or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identifier (RFID) technology, an infrared data association (IrDA) technology, an ultra-wideband (UWB) technology, a Bluetooth (BT) technology, and other technologies.

In exemplary embodiments, the apparatus 800 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus 800 may use the circuitries in combination with the other hardware or software components for performing the above described methods. Each module, sub-module, unit, or sub-unit in the disclosure may be implemented at least partially using the one or more circuitries.

In one or more exemplary embodiments, there is also provided a non-transitory computer-readable storage medium including instructions, such as included in the memory 804, executable by the processor 820 in the apparatus 800, for performing the above-described methods. For example, the non-transitory computer-readable storage medium may be a ROM, a RAM, a CD-ROM, a magnetic tape, a floppy disc, an optical data storage device, and the like.

Figure 9:
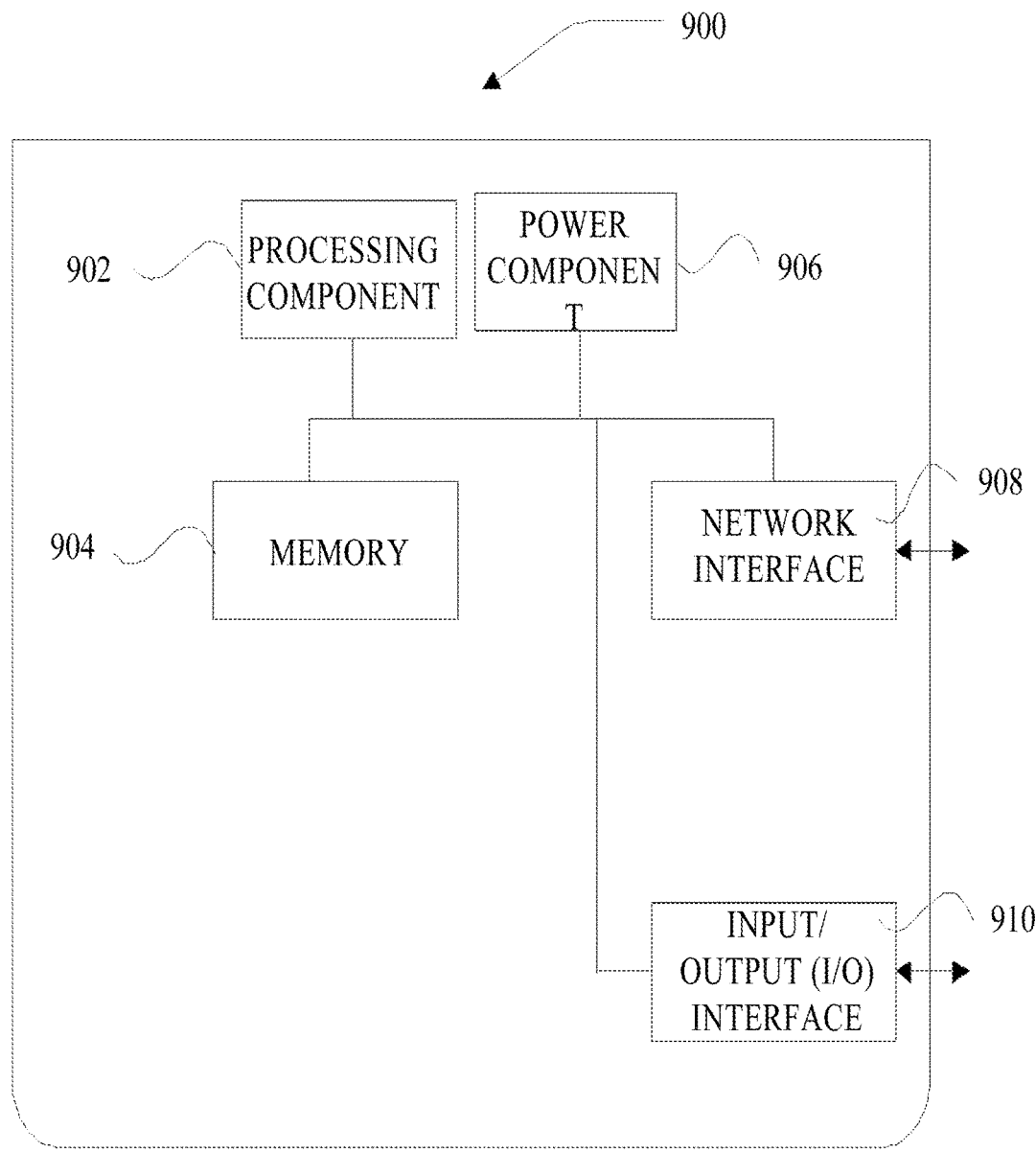
FIG. 9 is a block diagram of a legitimate installation package acquiring apparatus according to another exemplary embodiment.

FIG. 9 is a block diagram of a legitimate installation package acquiring apparatus 900 according to another embodiment of the disclosure. For example, the apparatus 900 may be provided as a network side device. Referring to FIG. 9, the apparatus 900 includes: a processing component 902 which further includes one or more processors; and storage resource represented by a memory 904 for storing instructions executable by the processing component 902, such as application programs. The application programs stored in the memory 904 may include one or more modules each corresponding to a set of instructions. In addition, the processing component 902 is configured to execute instructions, so as to perform the above legitimate installation package acquiring methods executed by an authentication server.

The apparatus 900 may also include a power component 906 which is configured to perform power management for the apparatus 900, a wired or wireless network interface 908 which is configured to connect the apparatus 900 to a network, and an input/output (I/O) interface 910. The apparatus 900 can operate an operation system stored in the memory 904, for example, Windows Server™, Mac OS X™, Unix™, Linux™, Free BSD™ or the like.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the disclosure will be apparent to those skilled in the art from consideration of the specification and practice of the disclosure disclosed here. The present disclosure is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method, comprising:
acquiring, by a terminal comprising a processor, characteristic information of a first installation package, the characteristic information uniquely identifying codes of the first installation package;
sending, by the terminal, the characteristic information to an authentication server, the characteristic information triggering the authentication server to feed back to the terminal a differential package corresponding to the characteristic information when the authentication server determines that the first installation package is an illegitimate installation package based on the characteristic information;
receiving, by the terminal, the differential package fed back by the authentication server, the differential package including a difference between the illegitimate installation package and a legitimate installation package corresponding to the illegitimate installation package; and
combining, by the terminal, the differential package with the first installation package to obtain the legitimate installation package;
acquiring characteristic information of a second installation package, when determining that the second installation package is an illegitimate installation package; and
sending reporting information to the authentication server, the reporting information triggering the authentication server to increment a number of times of reporting the second installation package corresponding to the characteristic information and to determine the second installation package corresponding to the characteristic information as an illegitimate installation package when the number of times of reporting is greater than a predetermined reporting threshold,
wherein the reporting information comprises the characteristic information, an identifier of the second installation package, and a download address of the second installation package, the download address triggering the authentication server to download the second installation package using the download address and generate a differential package using the downloaded second installation package and a legitimate installation package corresponding to the second installation package when determining the second installation package as an illegitimate installation package.

2. The method according to claim 1, wherein acquiring the characteristic information of the first installation package comprises:
when starting an installation process to install the first installation package, intercepting the installation process and acquiring the characteristic information of the first installation package.

3. The method according to claim 2, further comprising:
after obtaining the legitimate installation package, starting the installation process to install the legitimate installation package.

4. An apparatus, comprising:
a processor; and
a memory configured to store instructions executable by the processor,
wherein the processor is configured to:
acquire characteristic information of a first installation package, the characteristic information uniquely identifying codes of the first installation package;
send the characteristic information to an authentication server, the characteristic information triggering the authentication server to feed back to the apparatus a differential package corresponding to the characteristic information when the authentication server determines that the first installation package is an illegitimate installation package based on the characteristic information;

receive the differential package fed back by the authentication server, the differential package including a difference between the illegitimate installation package and a legitimate installation package corresponding to the illegitimate installation package;

combine the differential package with the first installation package to obtain the legitimate installation package;

acquire characteristic information of a second installation package, when determining that the second installation package is an illegitimate installation package; and send reporting information to the authentication server, the reporting information triggering the authentication server to increment a number of times of reporting the second installation package corresponding to the characteristic information and to determine the second installation package corresponding to the characteristic information as an illegitimate installation package when the number of times of reporting is greater than a predetermined reporting threshold, wherein the reporting information comprises the characteristic information, an identifier of the second installation package, and a download address of the second installation package, the download address triggering the authentication server to download the second installation package using the download address and generate a differential package using the downloaded second installation package and a legitimate installation package corresponding to the second installation package when determining the second installation package as an illegitimate installation package.

5. The apparatus of claim 4, wherein acquiring the characteristic information of the first installation package comprises: when starting an installation process to install the first installation package, intercepting the installation process and acquiring the characteristic information of the first installation package.

6. The apparatus of claim 5, wherein the processor is further configured to: after obtaining the legitimate installation package, start the installation process to install the legitimate installation package.

* * * * *